US006713223B2

(12) United States Patent
Kühn et al.

(10) Patent No.: US 6,713,223 B2
(45) Date of Patent: Mar. 30, 2004

(54) DEVICE FOR ARTICULATED CONNECTION BETWEEN A CONTROL ELEMENT AND A CONTROL ROD WITH A BALL HEAD

(75) Inventors: Alexander Kühn, Ebern (DE); Stefan Gebert, Gestungshausen (DE); Christoph Keller, Massbach (DE)

(73) Assignee: FTE automotive GmbH & Co. KG (DE)

( * ) Notice: Subject to any disclaimer, the term of this patent is extended or adjusted under 35 U.S.C. 154(b) by 0 days.

(21) Appl. No.: 09/981,284

(22) Filed: Oct. 17, 2001

(65) Prior Publication Data

US 2002/0090253 A1 Jul. 11, 2002

(30) Foreign Application Priority Data

Oct. 3, 2000 (DE) .......................................... 100 53 819

(51) Int. Cl.[7] ................................................. F16C 11/00
(52) U.S. Cl. ........................ 430/135; 403/122; 403/143
(58) Field of Search ..................... 403/76, 326, 329, 403/315, 122, 123, 135, 137, 139–143; 92/187

(56) References Cited

U.S. PATENT DOCUMENTS

| 1,452,932 A | * | 4/1923 | Pritchard ..................... 403/135 |
| 2,910,260 A | * | 10/1959 | Tanner ........................ 403/76 |
| 4,225,261 A |   | 9/1980 | Marx |
| 4,527,925 A |   | 7/1985 | Bauer et al. |
| 5,833,383 A | * | 11/1998 | Bauman ..................... 403/122 |

FOREIGN PATENT DOCUMENTS

| DE | 44 24 062 A1 | 1/1996 |
| DE | 198 33 030 A1 | 1/1999 |
| EP | 0 229 350 B | 3/1991 |

OTHER PUBLICATIONS

European Search Report, Jul. 30, 2003.

* cited by examiner

Primary Examiner—Lynne H. Browne
Assistant Examiner—Michael P. Ferguson
(74) Attorney, Agent, or Firm—McAndrews, Held & Malloy, Ltd.

(57) ABSTRACT

A device for articulated connection between a control element and a control rod having a ball head comprising a main body attachable to the control element. The main body envelops a locating section providing positive location for the ball head and has an opening area through which the control rod extends when the device is assembled. According to the invention, the locating section is in two parts whereby the main body forms a part into which the ball head can be introduced through a joint duct located outside the opening, while a molding insertable into the joint duct forms the other part of the locating section. As a result, a simple device is created, guaranteeing connection between the control element and the control rod which is backlash-free or has little backlash.

15 Claims, 3 Drawing Sheets

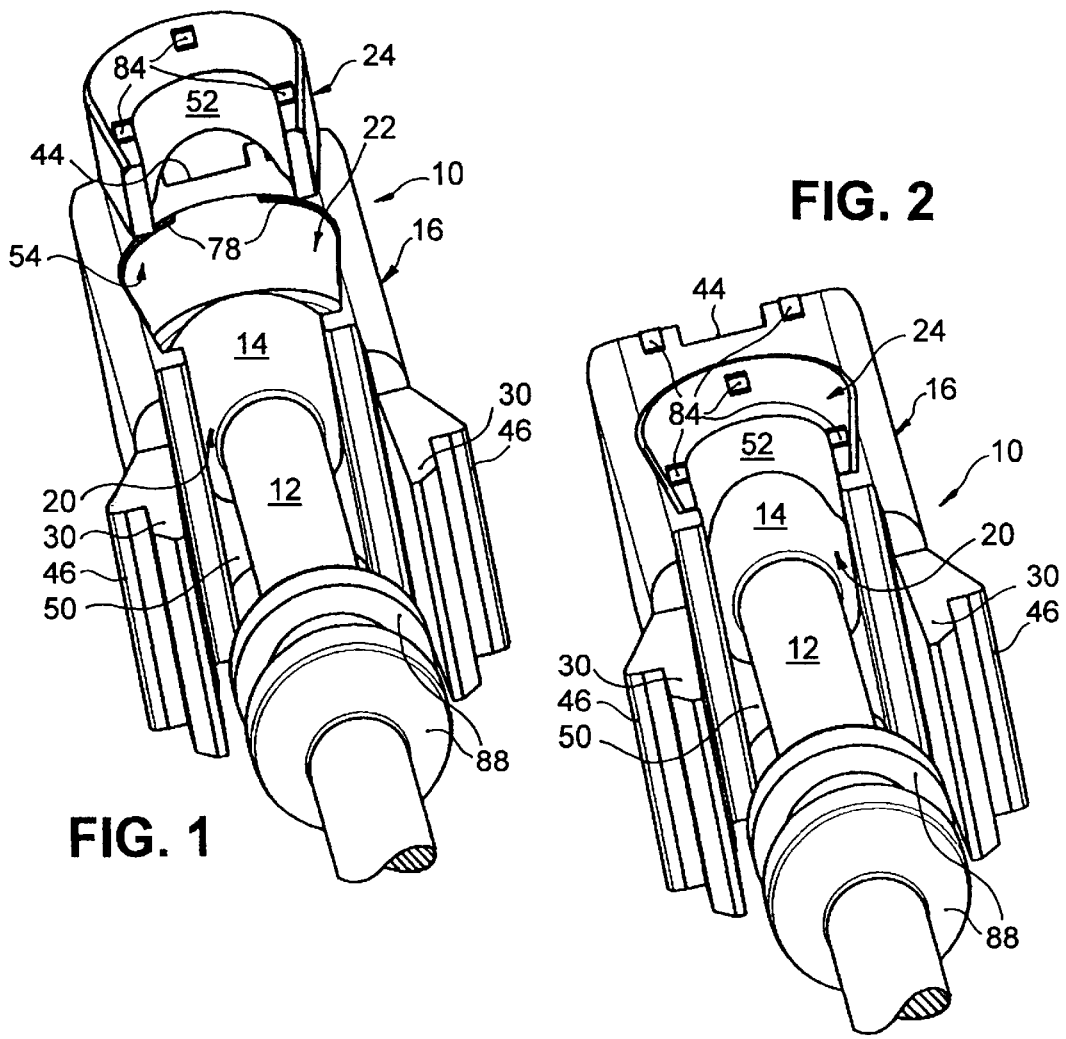
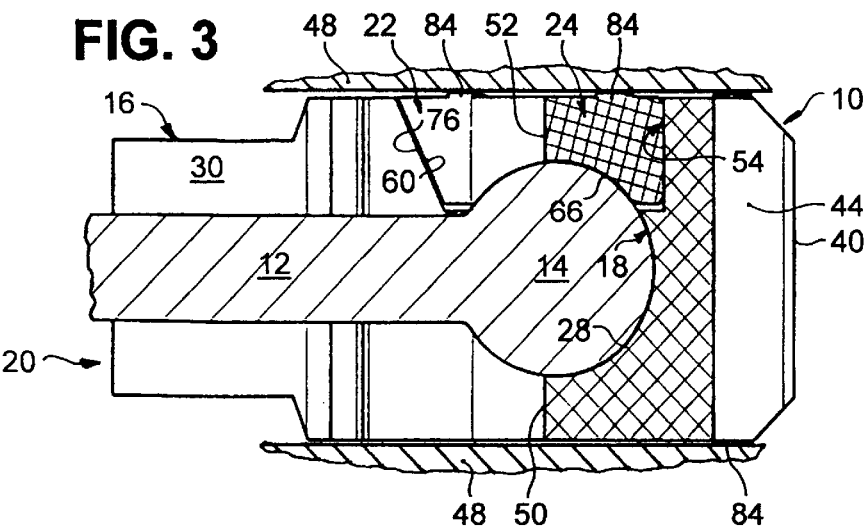

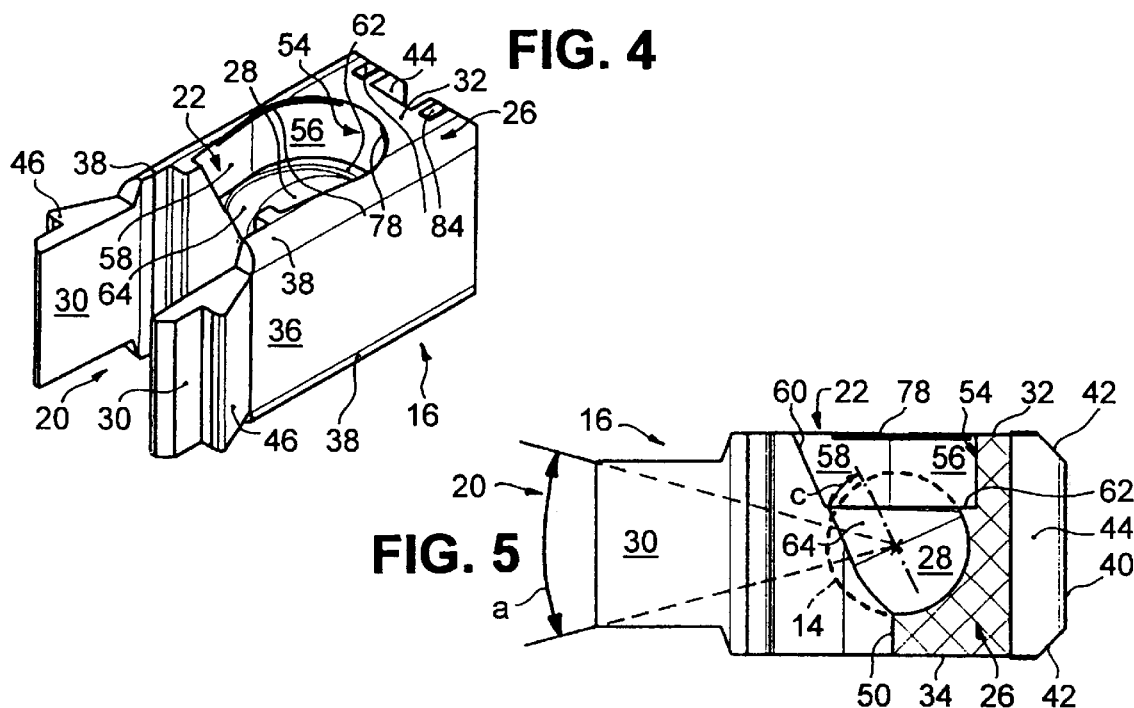
FIG. 4
FIG. 5
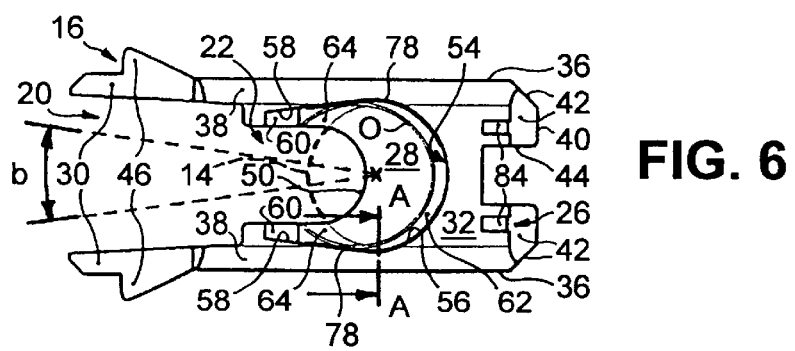
FIG. 6
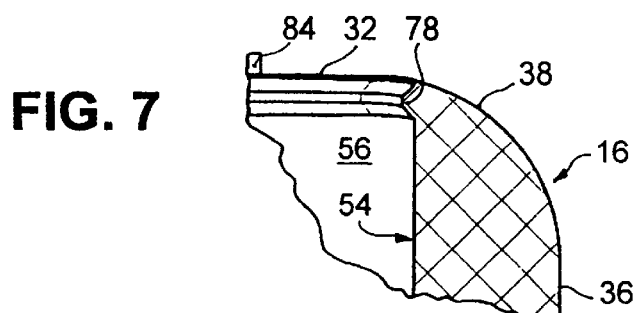
FIG. 7
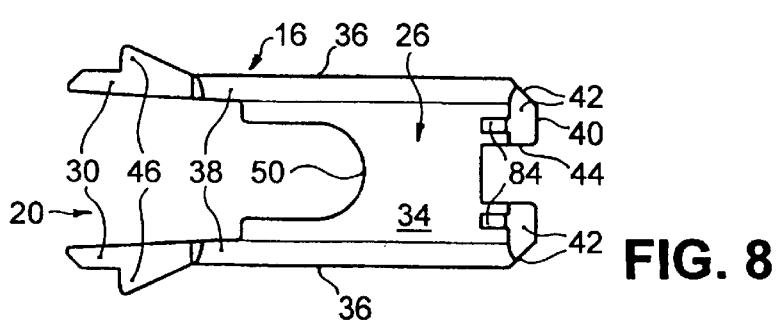
FIG. 8

DEVICE FOR ARTICULATED CONNECTION BETWEEN A CONTROL ELEMENT AND A CONTROL ROD WITH A BALL HEAD

DESCRIPTION OF THE PRIOR ART

This invention relates to a device for articulated connection between a control element and a control bar with a ball head according to the characterising definition of claim 1. In particular, the invention relates to a device designed to provide an articulated connection between a control element in the form of a pedal and a piston rod attached to a piston of a hydraulic cylinder.

Such devices are used for example in motorized vehicles where it is necessary to connect a pedal hinged to a pedal box to a piston rod with a ball head at its end to ensure its efficient operation, the other end of the piston rod being hinged at the piston or a clutch control or main brake cylinder. At the same time, compressive or pulling forces must be transmitted during a working cycle between the parts such as the pedal and the piston rod moving in their angular position in relation to each other depending on whether the pedal is being pressed down or released.

European patent specification EP 0 229 350 B1 discloses a generic articulated connection having a one-piece insert part which connects a pedal with a ball head of a piston rod ensuring efficient operation. The insert part made of plastic is clipped here into a part of the pedal which is approximately U-shaped and has a bearing socket to hold the ball head. The bearing socket has an undercut into which the ball head can be pressed as if it were a snap-in connection and serving the purpose of retaining the ball head in the bearing socket during operation. The insert part has a hopper-like inlet area at the entry to the bearing socket. During assembly of the known articulated connection, the ball head is pressed through the entry section into the bearing socket by forcing the undercut. The piston rod extends through the entry area when this articulated connection is in its assembled condition or in operation.

A disadvantage of this state of the art can be seen in the fact that there is a danger, particularly at high temperatures, of the ball head permanently deforming the undercut at the bearing socket when a higher tension load is applied to the piston rod, possibly resulting in unacceptable play at the controls or, in the worst instance, in the ball head even being forced out of the bearing socket when the pedal is moved back rapidly and uncontrollably from its control position to its resting position or when it is pulled by the pedal.

The purpose of the invention is to create a device of the simplest possible design, to provide an articulated connection between a control element and a control rod with a ball head guaranteeing a reliable connection between the control element and a control rod which would be permanently backlash-free or have little backlash.

SUMMARY OF THE INVENTION

According to the present invention, there is provided a device to provide an articulated connection between a control element and a control rod with a ball head, the device having a main body, attachable at the control element, that envelops a locator section, for positive location of the ball head and that has an opening section, through which the control rod extends when the device is assembled; wherein the locator section is in two parts, the main body forming one of said parts and having a joint duct located outside the opening area, into which the ball head can be introduced, the other part of the locator section being formed by a molding insertable in the joint duct.

In particular the locator section enclosed by the main body locatable at the control element on a device of a generic type is in two parts, the main body forming one part into which the ball head can be introduced through a joint duct located outside the opening area surrounding the piston rod in operation, while a molding insertable in the joint duct forms the other part of the locating section.

In this design of articulated connection, the ball head is enveloped to a greater degree than according to the known state of the art; in other words, it can be said that the size of the undercut at the locator section provided for positive location of the ball head in the direction of the opening area, that is in the direction in which the main part of the control forces are acting in operation, can be made larger. This is not hindered by the assembly of the articulated connection because the undercut at the locator section in the direction of the opening area does not have to be overcome when joining the ball head since it is on the other hand possible to join the ball head to the main body through the joint duct which is outside the opening area before the locator section is completed by inserting the molding. Therefore, the direction in which the ball head is joined to the main body is different from the direction in which most of the operating forces act, that is different than in the case of the state of the art referred to.

As a result, the mechanical capacity of the articulated connection is improved and greater forces can be transmitted than in the case of the abovementioned state of the part, particularly at higher temperatures, without the main body and/or the molding suffering permanent deformation or the ball head being pulled out of the main body which would be unacceptable. This guarantees absence of backlash or very little backlash at the articulated connection and greater safety against pulling out.

The main body and the molding which form parts of the locator section for the ball head are each provided with a spherical cup to produce surface contact between the ball head and the locator section which would be almost non-wearing.

In principle, it is possible to provide the part of the locator section positively locating the ball head on the main body side with a small undercut in the direction of the joint duct so that the ball head can be snapped into the main body when assembling the articulated connection, before inserting the molding into the joint duct. However, a design is preferred according to which the inside dimension of the joint duct in the main body is greater or the same as the diameter of the ball head at each point of the joint duct. This allows on the other hand joining the ball head to the main body to advantage mainly without applying a force. On the other hand, making the injection cast main body preferably from plastic is simplified according to claim 12 because it is not necessary to release the main body from the mold by force and thus no specific mold release sequence needs to be observed. In addition, a design of the locator section for the ball head on the main body side without an undercut in the direction of the joint duct allows the base body to be released economically from the mold immediately after the injection casting process. If there were an undercut at the main body in the direction of the joint duct, the injection cast main body would first have to cool down for a certain time before it could be released from the mold; otherwise, there would be a risk of permanently deforming the undercut while releasing a warm main body from the mold, possibly resulting in unacceptable backlash in the articulated connection during operation.

The molding at the main body can be fixed by means of a snap connection. This feature facilitates assembly of the articulated connection because the molding inserted into the joint duct of the main body cannot drop out of the joint duct of the main body when joining the main body to the control element. The joint duct can have a suitable recess for positive location of the molding, this recess having a section protruding to the inside at the open end of the joint duct which, as part of the snap connection, engages the molding towards the back in its inserted position in the joint duct.

The main body may be provided with locating lugs clicking into the recesses in the control element to hold the main body positively at the control element. The main body of this design makes the articulated connection simple and economical to assemble.

The main body, viewed from above, may be generally U-shaped, having a base in which part of the locating section is shaped to provide a positive hold for the ball head and two arms extending away from the base which have the locating lugs on them and delimit the opening area for the control rod. The main body can be easily set to a defined position at the control element if the main body base is provided with a traverse slot on the side away from the locating section for positively locating the ball head.

The main body and/or the molding may be provided with protrusions, the purpose of which is to compensate any tolerances to advantage. Assembling the articulated connection is made easier if each of the protrusions at the main body and/or the molding has a bevel which is on the side facing the control element when joining it to the control element.

BRIEF DESCRIPTION OF THE DRAWINGS

For a better understanding of the invention and to show how the same may be carried into effect, reference will now be made, by way of example, to the accompanying drawings, in which:—

FIG. 1 is a perspective view of a device providing an articulated connection between a piston rod with a ball head and a pedal (not shown here), the ball head being located in a part of a main body forming part of a locator section for positive location of a ball head, without the molding which completes the locating section not yet inserted into the main body;

FIG. 2 is a perspective view of the device in FIG. 1, with the molding inserted into the main body to complete the locating section;

FIG. 3 is a longitudinal section through the device shown in FIG. 2, with a partly shown pedal inserted into a locating section;

FIG. 4 is a view of the main body of the device in FIGS. 1 to 3 to a different scale, shown in perspective;

FIG. 5 is a longitudinal section through the main body shown in FIG. 4;

FIG. 6 is a plan view of the main body shown in FIG. 4;

FIG. 7 is an enlarged section showing part of the main body along line A—A in FIG. 6, rotated clockwise through 90° in the drawing plane;

FIG. 8 is a view from below of the main body shown in FIG. 4;

DESCRIPTION OF THE PREFERRED EMBODIMENT

Figure 9:
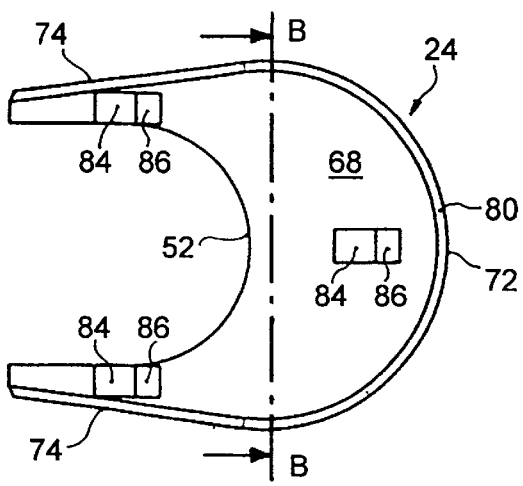
FIG. 9 is an enlarged plan view of the molding of the device shown in FIGS. 1 to 3.

FIGS. 1 to 3 show a device 10 for an articulated connection between a pedal, not shown in detail, and a piston rod 12 with a ball head 14. The device 10 has a main body 16 which can be fixed at the pedal in a way described in greater detail below. The main body 16 encloses a locator section generally marked 18 in FIG. 3 which serves the purpose of positively holding the ball head 14 and has an opening area 20 through which the piston rod 12 extends when the device 10 is in assembled condition or in operation. It is essential that the locator section 18 is in two parts, as will be explained in greater detail, whereby the main body 16 forms one part into which the ball head 14 can be introduced through a joint duct generally marked 22 in FIG. 1, located outside the opening area 20, or offset in relation to the opening area 20, while a molding 24 which can be inserted into the joint duct 22 forms the other part of the locator section 18.

FIGS. 4 to 8 show the injection molded main body 16 from a plastic such as POM (polyoxymethylene) in detail. The main body 16 as seen from above in FIG. 6 is mainly U-shaped with a base 26 in which one part of the locating section 18 designed to provide positive location for the ball head 14 is in the form of a spherical cup section 28, two mirror-like opposite arms 30 extending from the base 26 delimiting the opening area 20 on the side. Seen in section, the main body 16 has a generally rectangular outer outline with rounded corners formed by one top flat surface 32, one-bottom flat surface 34, two flat side faces 36 and rounded edge sections 38. On the side of the base 26 away from the spherical cup section 28, the main body 16 has a flat end face 40 adjoining the top face 32, the bottom face 34 and the side face 36 over the bevels 42 which facilitate joining the main body 16 to the pedal. Starting from the end face 40, the base 26 of the main body 16 is provided with a transverse slot 44 in the center in one plane with the joint duct 22 and serving the purpose of positioning the main body 16 at the pedal.

The arms 30 of the main body 16 carry on their outside faces facing away from each other locating lugs 46 adjoining the side faces 36, clicking into the recesses in the pedal, not shown here, with the arms 30 flexibly deforming, to hold the main body 16 at the pedal. With regard to the pedal, which is preferably made of steel plate or plastic, it must be mentioned at this point that it has a locator for the main body 16 with a rectangular section which is delimited by the side cheeks of the pedal and the stays 48 extending between them, indicated in FIG. 3, apertures for the locating lugs 46 being provided in the side cheeks. A section extending between the stays 48 of the pedal and engaging into the transverse slot 44 of the main body 16 to hold it in positive location when the device 10 is assembled, is not shown in FIG. 3 for the sake of clarity.

As can be seen in particular in FIGS. 6 and 8, the arms 30 of the main body 16, narrower towards their ends are slightly beveled on the inside, at the transition between the side faces 36 and the locating lugs 46, to enlarge the opening area 20 for the piston rod 12. FIGS. 5 and 6 show the ball head 14 and the angle ranges a and b within which the center axis of the piston rod 12 moves when the articulated connection is in operation, viewed in the direction of the two planes at right angles to each other. As can be seen from FIG. 6, the piston rod 12 cannot swing beyond the operating angle range b, being prevented from doing so by the arms 30 of the main body 16. However, it is possible to swing the piston rod 12 beyond the operating angle range a, e.g. for assembly purposes, because in the example of the design shown the main body 16 is provided at its bottom face 34 with an appropriate longitudinal slot 50 (FIGS. 3, 5 and 8), and so is the molding 24 with the longitudinal slot 52 (FIGS. 3, 9 and 13).

According to FIG. 5 in particular, the joint duct 22 for the ball head 14 extends up to the spherical cup section 28, starting from the top face 32 of the main body 16. The joint duct 22 has a recess 54 in its top area, shown in FIG. 5, for positive location of the molding 24. This recess 54 is delineated on the side by a cylindrical surface section 56 with a circumferential angle greater than 180° extending at right angles to the top face 32 of the main body 16, two adjacent flat side faces 58 opposite to each other which include an angle and also extend at right angles to the top face 32, and, as in FIG. 5, on the left by two bevels 60 in one plane, extending at an angle to the top face 32. A cylindrical surface section 64 adjoins the recess 54 in the direction of the spherical cup section 28 over a shoulder 62 extending parallel to the top face 32, its centerline being marked by a dot and dash line in FIG. 5 extending parallel to the bevels 60, at an angle to the top surface 32. The diameter of the cylindrical surface section 64 in the version of the design shown is mainly the same as the diameter of the ball head 14 or the spherical cup section 28 so that the inside diameter of the joint duct 22 in the main body 16 at each point of the main body 22 is the same or larger than the diameter of the ball head 14. As shown in FIGS. 5 and 6, the plane of the shoulder 62 passes through the cylindrical surface section 64 at an angle c which is smaller than 90° resulting in an elliptical opening section 0, the smaller axis of which is the same as the diameter of the ball head 14. It is obvious that the ball head 14 can therefore be joined to the spherical cup section 28 through the joint duct 22 without applying force, that is, without overcoming an undercut.

The molding 24 shown in greater detail in FIGS. 9 to 13 is also injection molded from a plastic such as POM and has a spherical cup section 66 for forming the other part of the locator section 18 for the ball head 14, the radius of which is also equal to the radius of the ball head 14. The molding 24 which is mainly crescent-shaped in the views in FIGS. 9 and 13 due to the longitudinal slot 52, has a flat top face 68 shown in FIG. 10 and a flat bottom face 70 parallel to it, in which the spherical cup section 66 is formed. As shown in FIG. 3, the vertical distance between the top face 68 and the bottom face 70 of the molding is slightly smaller than the distance between the top face 32 and the shoulder 62 of the main body 16 so that there is a small gap between the bottom face 70 of the molding 24 and the shoulder 62 of the main body 16 when the device 10 is in assembled condition in which the spherical cup sections 28 and 66 rest with their surfaces at the ball head.

Figure 10:
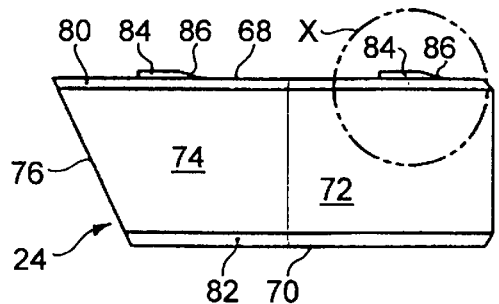
FIG. 10 is a front view of the molding shown in FIG. 9.
Figure 11:
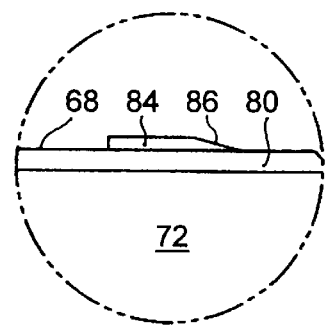
FIG. 11 is an enlarged view of detail X in FIG. 10.
Figure 12:
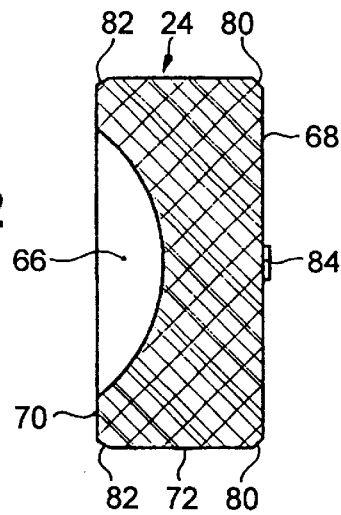
FIG. 12 is a section through the molding along line B—B in FIG. 9.
Figure 13:
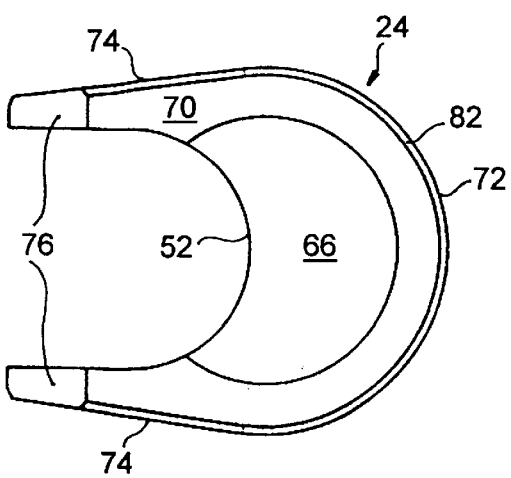
FIG. 13 is a view from below of the molding shown in FIG. 9.

The molding 24 also has a cylindrical surface section 72, adjoining side faces 74 which together include an angle and the bevels 76 closing the molding 24 to the left in FIGS. 10 and 13, consistent with the recess 54. The molding 24 has such dimensions that when the device 10 is assembled, the cylindrical surface section 56 of the main body 16 and the side faces 74 of the molding 24 rest at the side faces 58 of the main body 16 while the bevels 76 of the molding 24 are at a slight distance away from the bevels 60 of the main body 16, as shown by a slightly thicker line in FIG. 3.

In the version of the design shown, the molding 24 is fixed to the main body 16 by means of a snap connection. For this purpose, to ensure positive location for the molding 24, the recess 54 provided at the main body 16 has at the open end of the joint duct 22 a profile 78 protruding inwards, shown in an enlargement in FIG. 7, formed by two curved sections, as in FIGS. 1, 4, 5 and 6, arranged mirror-like opposite to each other and extending from the cylindrical surface section 56 to the side faces 58 of the recess 54. With the molding 24 inserted into the joint duct 22 of the main body 16, the profile 78 engages behind the molding 24, the molding 24 being provided for this purpose with a chamfer 80 between the top face 68 and the cylindrical surface section 72 or the side faces 74. A corresponding chamfer 82 is provided between the bottom face 70 and the cylindrical surface section 72 or the side faces 74 of the molding 24.

Furthermore, the main body 16 and the molding 24 of the illustrated example of design has protrusions or projections 84 at suitable places on the top face 32 and the bottom face 34 or the top face 68, which serve the purpose of compensating any tolerances by flexible or plastic deformation. As the enlargement in FIG. 11 in particular shows, each of the protrusions or projections 84 has a bevel 86 which is on the side facing the pedal during the joining operation, to facilitate joining. According to FIG. 3 showing the assembled device 10, the protrusions 84 are pressed together with the pedal stays 48.

Finally, it must be noted with regard to the piston rod 12 made of steel or plastic, partly shown in FIGS. 1 to 3, that it is attached by means of an articulated joint at the end away from the ball head 14 at a hydraulic piston not shown here, and provided with two flanges 88 between its ends, the flange facing away from the ball head 14 serving as a stop to limit the stroke of the hydraulic piston in the thrust direction, a bellows, not shown here, of a hydraulic cylinder, not shown here either, being attached between them.

To assemble the device 10 described above, the ball head 14 of the piston rod 12 is introduced through the joint duct 22 into the main body 16 in the main without applying a force, until the ball head 14 comes into contact with the face of the spherical cup section 28 of the main body 16. The molding 24 is then introduced into the recess 54 of the joint duct 22 until the spherical cup section 66 of the molding 24 comes into contact with the face of the ball head 14. In the main, the molding 24 simultaneously engages behind the profile 78 of the aperture 54.

The unit preassembled in this way, comprising the main body 16 and the molding 24, is then pushed, together with the ball head 14 of the piston rod 12 held between them, from the left in FIG. 3 into the recess between the stays 48 of the pedal, until the section between the stays 48 of the pedal, not shown here, engages into the transverse slot 44 of the main body 16 and the main body 16 abuts with its end face 40 in the pedal recess. During this push-in movement, the arms 30 of the main body 16 spring towards each other due to the locating lugs 46 coming into contact with the side cheeks of the pedal, until the locating lugs 46 engage the recesses, not shown here, in the side cheeks of the pedal.

It is evident that the locator section 18 providing positive location for the ball head 14 can transmit thrust or traction forces from the pedal to the piston rod 12 or from the piston rod 12 to the pedal, the ball head 14 being supported on the locator section 18. The forces transmitted at the same time to the main body 16 directly through the ball head 14 or indirectly through the molding 24 are for their part backed up at the pedal in the traction direction over the locating lugs 46 and in the thrust direction over the end faces 40 of the main body 16.

To dismantle the device 10, the arms 30 of the main body 16 must be pressed inwards until the locating lugs 46 are released from the recesses in the pedal. The device 10 can then be pulled by the piston rod 12 out of the pedal. Swinging the piston rod 12 as in FIG. 3 up or down until the piston rod 12 hits the longitudinal slot 52 of the molding 24 or the longitudinal slot 50 of the main body 16, will produce an upward component of force in FIG. 3 due to the lever action of the piston rod 12 which will release the molding 24 from its engagement with the main body 16. Finally, the ball head 14 can be removed from the main body 16 along the joint duct 22 without having to apply any significant force.

In summary, therefore, the device provides articulated connection between a control element and a control rod with a ball head with a main body attached to the control element. The main body envelops a locating section providing positive location for the ball head and has an opening area through which the control rod extends when the device is assembled. The locating section is in two parts, the main body forming one part into which the ball head can be introduced through a joint duct located outside the opening area, the other part of the locating section being formed by a molding insertable into the joint duct. The result is a simple device which guarantees reliable connection between the control element and the control rod permanently backlash-free or having very little backlash.

I claim:

1. A device for providing an articulated connection between a control element and a control rod with a ball head, the device having a main body, attachable to the control element, that envelops a locator section, for positive location of the ball head and that has an opening area, through which the control rod extends when the device is assembled;
   wherein the locator section is in two parts, the main body forming one of said parts, whereas the other part of the locator section is formed by a molding;
   wherein the main body has a joint duct offset in relation to the opening area, the ball head being introducible into said one part of the locator section through said joint duct in a joining direction; and
   wherein the molding is insertable into the joint duct in said joining direction of the ball head in order to hold the ball head between the main body and the molding.

2. A device according to claim 1, wherein the joint duct has an inside diameter in the main body, the inside diameter at each point of the joint duct being larger than or equal to the diameter of the ball head.

3. A device according to claim 1, wherein the molding can be fixed to the main body by means of a snap connection.

4. A device according to claim 1, wherein the joint duct has a recess for positive location of the molding.

5. A device according to claim 4, wherein the joint duct has an open end and the recess for positive location of the molding has a profile protruding inwards at the open end of the joint duct and engaging the molding around the rear of the molding in the molding's position in the joint duct.

6. A device according to claim 1, wherein the main body has protrusions serving the purpose of compensating for any tolerances.

7. A device according to claim 6, wherein each of the protrusions on the main body has a bevel on a side of the protrusion facing the control element when the main body is being joined to the control element.

8. A device according to claim 1, wherein the molding has protrusions serving the purpose of compensating for any tolerances.

9. A device according to claim 8, wherein each of the protrusions on the molding has a bevel on a side of the protrusion facing the control element when the main body is being joined to the control element.

10. A device according to claim 1, wherein the main body is injection molded from plastic.

11. A device according to claim 1, wherein the molding is injection molded from plastic.

12. A device for providing an articulated connection between a control element and a control rod with a ball head, the device having a main body, attachable to the control element, that envelops a locator section, for positive location of the ball head and that has an opening area, through which the control rod extends when the device is assembled;
    wherein the locator section is in two parts, the main body forming one of said parts, whereas the other part of the locator section is formed by a molding;
    wherein the main body has a joint duct offset in relation to the opening area, through which the ball head can be introduced into said one part of the locator section;
    wherein the molding is insertable into the joint duct in a joining direction of the ball head in order to hold the ball head between the main body and the molding; and
    wherein the main body and the molding are each provided with a spherical cup section forming the parts of the locator section for the ball head.

13. A device for providing an articulated connection between a control element and a control rod with a ball head, the device having a main body, attachable to the control element, that envelops a locator section, for positive location of the ball head and that has an opening area, through which the control rod extends when the device is assembled;
    wherein the locator section is in two parts, the main body forming one of said parts, whereas the other part of the locator section is formed by a molding;
    wherein the main body has a joint duct offset in relation to the opening area, through which the ball head can be introduced into said one part of the locator section;
    wherein the molding is insertable into the joint duct in a joining direction of the ball head in order to hold the ball head between the main body and the molding; and
    wherein there are provided recesses in the control element and the main body has locating lugs engageable in the recesses in the control element to fix the main body to the control element.

14. A device according to claim 13, wherein the main body is generally U-shaped when viewed in a plan view and has a base in which one part of the locator section for positive location of the ball head is formed, and two arms carrying the locating lugs, extending from the base.

15. A device according to claim 14, wherein the main body has a base, which has, on a side facing away from the locator section for positive location of the ball head, transverse slot serving the purpose of positioning the main body on the control element.

* * * * *